US008219632B2

(12) United States Patent
Jarvis et al.

(10) Patent No.: US 8,219,632 B2
(45) Date of Patent: Jul. 10, 2012

(54) EFFICIENT USE OF PEER CACHE SPACE IN LARGE SCALE FILE DISTRIBUTIONS

(75) Inventors: Steven Armand Jarvis, Austin, TX (US); Douglas Ledden, Austin, TX (US); Liliana Orozco, Del Valle, TX (US); Brian George Vassberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 12/472,788

(22) Filed: May 27, 2009

(65) Prior Publication Data

US 2010/0306252 A1     Dec. 2, 2010

(51) Int. Cl.
G06F 15/167     (2006.01)
(52) U.S. Cl. ........ 709/213; 709/201; 709/202; 709/203; 709/232
(58) Field of Classification Search .................. 709/213, 709/201, 202, 203, 232
See application file for complete search history.

(56) References Cited

U.S. PATENT DOCUMENTS

| | | | |
|---|---|---|---|
| 5,325,505 A * | 6/1994 | Hoffecker et al. ............ | 1/1 |
| 6,076,151 A | 6/2000 | Meier | |
| 6,453,404 B1 | 9/2002 | Bereznyi et al. | |
| 6,615,253 B1 | 9/2003 | Bowman-Amuah | |
| 7,734,751 B2 * | 6/2010 | Donescu et al. ............ | 709/223 |
| 2005/0198296 A1 | 9/2005 | Teodosiu et al. | |
| 2008/0222154 A1 | 9/2008 | Harrington et al. | |
| 2010/0011061 A1 * | 1/2010 | Hudson et al. ............ | 709/204 |

OTHER PUBLICATIONS

PCT International Search Report for application PCT/EP2010/056540 dated Jul. 12, 2010.
Curry et al., "Modeling Differentiated Services in Conservative PDES", Proceedings of the 2003 Winter Simulation Conference, New Orleans, pp. 658-666.
Kwong et al., "Building Heterogeneous Peer-to-Peer Networks: Protocol and Analysis", IEEE/ACM Transactions on Networking, Apr. 2008, vol. 16, No. 2, pp. 281-292.
Hu et al., "Distributed Automatic Service Composition in Large-Scale Systems", DEBS '08, Jul. 1-4, Rome, Italy, pp. 233-244.
Diao et al., "Control of Large Scale Computing Systems", ACM SIGBED Review, vol. 3, Issue 2, Apr. 2006, pp. 17-22.

* cited by examiner

Primary Examiner — Lan-Dai T Truong
(74) Attorney, Agent, or Firm — Yee & Associates, P.C.; Jeffrey S. LaBaw (57) ABSTRACT

A mechanism for providing efficient use of peer cache space in large scale file distributions. A peer computer receives a download plan for a requested file. The download plan specifies a number of peer servers where the file is stored, a minimum number of peer servers required to store the file, and a saturation level for the file in the zone. When the peer computer downloads the file from one or more peer servers listed in the download plan, the peer computer determines whether the file is required to be cached at the peer computer by comparing the minimum number of peer servers in the plan required to store the file against the number of peer servers listed in the plan. If the minimum number required to store the file is greater the number of peer servers listed in the plan, the peer computer caches the file.

17 Claims, 4 Drawing Sheets

EFFICIENT USE OF PEER CACHE SPACE IN LARGE SCALE FILE DISTRIBUTIONS

BACKGROUND

1. Field

The disclosure relates generally to an improved data processing system and more specifically to distributing files in a computer network. Still more particularly, the disclosure relates to a computer implemented method, apparatus, and computer program product for providing efficient use of peer cache space in large scale file distributions.

2. Description of the Related Art

Dynamic content delivery is a service which uses a specially designed computer system for efficiently distributing large files to multiple clients. In a dynamic content delivery system, a file is published by uploading the file to a depot server. The file is then copied across the network to other depot servers. When a client requests a file download, a centralized storage manager in the content delivery system creates a download plan and sends the plan to the client.

The download plan typically contains a client specific authorization to download the file using the dynamic content delivery system and a detailed plan for downloading the file. The detailed plan contains one or more locations, such as dedicated file (depot) servers, where the file is available for download. The detailed plan also specifies various aspects of the download process, including the maximum download speed for each source, the number of simultaneous connections to open at a time, and the minimum and maximum segment size. A client uses the download plan to open connections to multiple depot servers and simultaneously retrieve different segments of the file from different depot servers.

In some file distribution systems, peer-to-peer downloading is often enabled to reduce the need for dedicated depot servers and reduce WAN (wide area network) traffic. In order for peering to be successful, each peer server (end-user system) in the file distribution network must dedicate a substantial amount of space for caching the files to be shared among the peer clients. When a file is distributed to a peer server, the file is cached in the peer server and is ready to be shared among close-by peer clients that also need the file. However, when a close-by peer client requests and downloads the file from the peer server, the peer client also caches a copy of the file and notifies the centralized storage manager that the peer client has a copy of the file. Consequently, if the file is requested by all end-user systems in a particular zone, then all end-user systems in the zone will have a copy of the cached file available for peering.

SUMMARY

The illustrative embodiments provide a computer implemented method, apparatus, and computer program product for providing efficient use of peer cache space in large scale file distributions. A peer computer in a file distribution environment receives a download plan for a requested file, wherein the download plan comprises a number of peer servers within the file distribution environment where the file is stored, a minimum number of peer servers in the file distribution environment required to store the file. Responsive to downloading the file from one or more of the peer servers listed in the download plan, the peer computer determines whether the file is required to be cached at the peer computer by comparing the minimum number of peer servers in the download plan required to store the file against the number of peer servers listed in the download plan. Responsive to a determination that the minimum number of peer servers required to store the file in the download plan is greater than the number of peer servers listed in the download plan, the peer computer caches the file.

Responsive to a determination that the minimum number of peer servers required to store the file in the download plan is not greater than the number of peer servers listed in the download plan, the peer computer determines whether to cache the file at the peer computer by comparing a random number generated at the peer client against the saturation level for the file in the download plan. If the peer computer determines that the random number generated at the peer computer is equal to or less than the saturation level for the file in the download plan, the peer computer caches the file. However, if the peer computer determines that the random number generated at the peer client is greater than the saturation level for the file in the download plan, the peer client refrains from caching the file at the peer computer.

DETAILED DESCRIPTION

As will be appreciated by one skilled in the art, the embodiments in the disclosure may be embodied as a system, method or computer program product. Accordingly, the embodiments in the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments in the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, it necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments in the disclosure may be written in any combination of one or more programming languages, including an object oriented programming language such as Java, Smalltalk. C++ or the like and conventional procedural programming, languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments in the disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
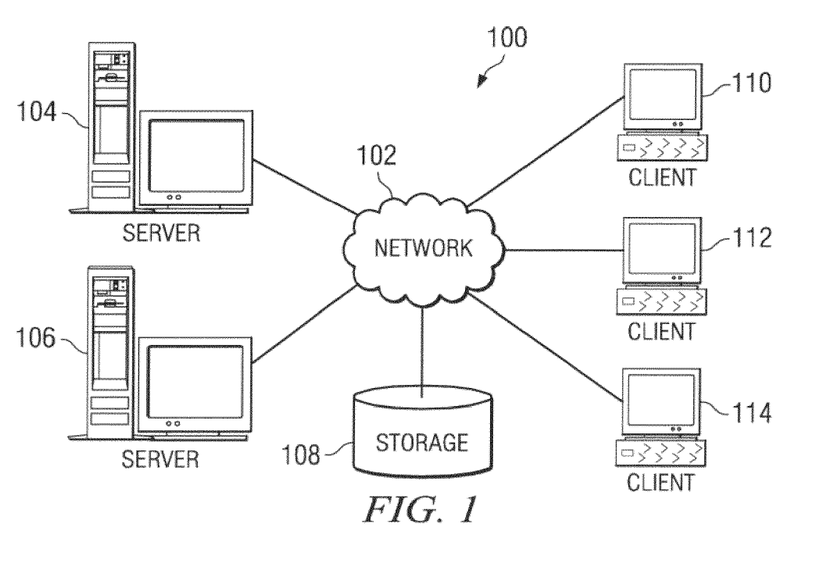
FIG. 1 depicts a pictorial representation of a distributed data processing system in which the illustrative embodiments may be implemented.
Figure 2:
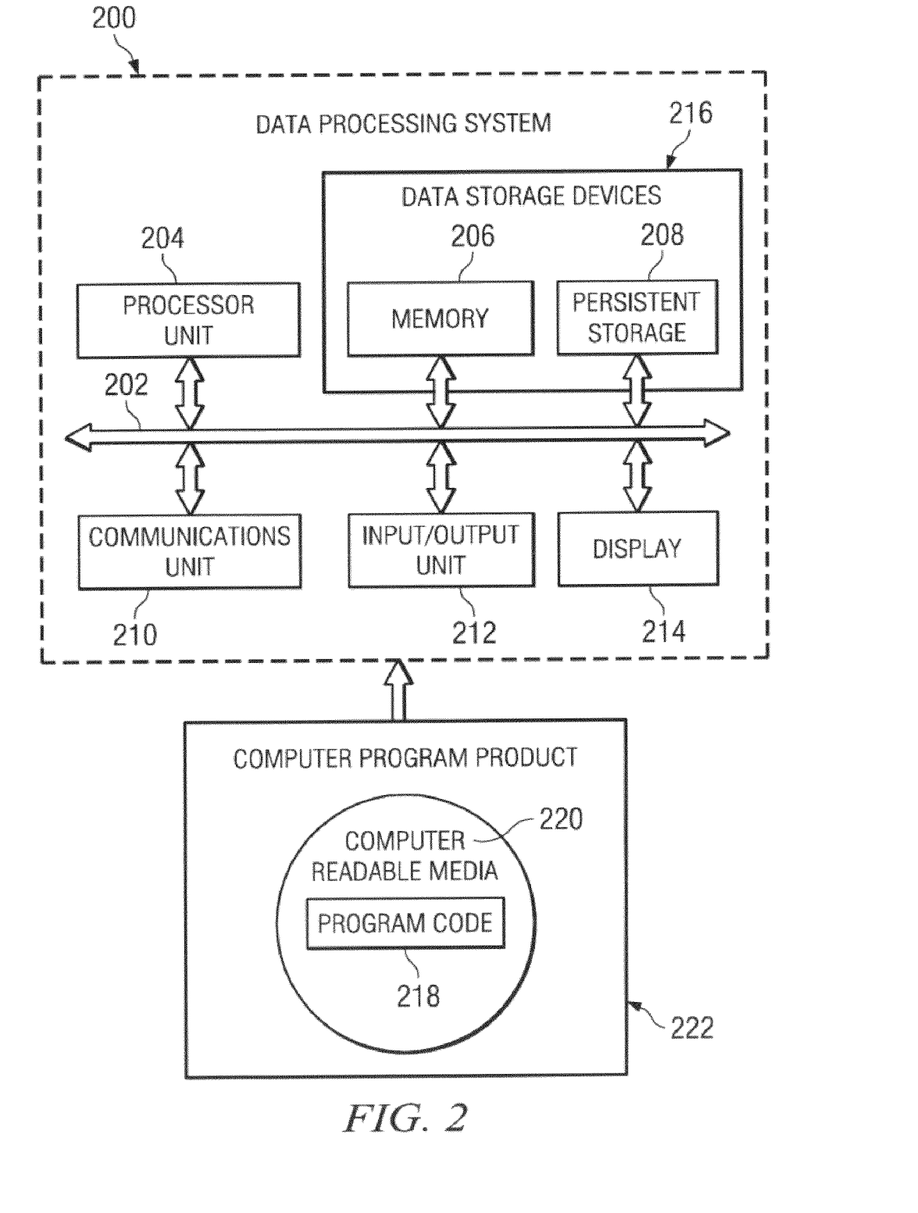
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A peer system comprises peer nodes that may simultaneously function as both "clients" and "servers" to the other nodes on the network. A node acting as a peer client may access data or a service provided by another node that is acting as a peer server in the peer system. When peer-to-peer downloading is enabled in a dynamic content delivery environment, each peer system must dedicate a substantial amount of space for caching the files to be shared among the nodes. For example, when a node acting as a peer client downloads a file from a node acting as a peer server or a depot server, the peer client caches a copy of the file for sharing among close-by peer clients that may also request the file. As each node that downloads the file will cache a copy of the file for peering (thereby acting as a peer server to other nodes requesting the file), all of the nodes in a designated network zone will have a stored copy of the same file. A network zone may comprise systems that are grouped together based on a physical/geographical basis or on a LAN/WAN basis. Zones are often defined as IP address ranges or a DNS (domain name system) domain. For example, a zone may be defined by the IP domain of *.cityname.companyname.com. Further, a subnet address may calculated by taking the subnet mask of a client data processing system and ORing the subnet mask with the IP address of the data processing system. For example, a client data processing system has a subnet mask of 255.255.255.0 and an IP address of 192.168.1.100. ORing the IP address and subnet mask together produces a result that any data processing system that has an IP address that matches 192.186.1.* is considered to be on the same subnet and is automatically matched to content servers on the same subnet, or zone.

A problem with existing peer downloading environments is that since a node's cache space is limited and only a certain number of files can be cached at one time, having a copy of the file in each node in the designated zone can be a waste of cache space. Therefore, the illustrative embodiments recognize the need for efficiently storing files for peering in a designated zone and avoiding unnecessary saturation of the same file for download. The illustrative embodiments also recognize that it would be beneficial to have as many different files as possible cached among the peer nodes in the zone, such that peer nodes obtain the files as needed from other peer nodes in an efficient manner.

The illustrative embodiments described herein provide an improved dynamic content delivery mechanism for distributing files in a designated network zone. The illustrative embodiments enable a peer node to determine, based on the desired level of saturation of the file for the zone whether or not to cache a copy of a downloaded file for sharing among other peer systems in the network zone. When a peer client requests one or more files from the central management center in the dynamic content delivery environment, the central management center creates a download plan. A download plan according to the illustrative embodiments may comprise information provided to a peer client in any form. The information may include, but is not limited to, a list of peer servers from which the peer client may obtain the requested file(s), and the locations of the peer servers, and a first value indicating a minimum number of peer servers in the network zone that are required to contain a copy of the file(s). The information may also include a second value indicating a saturation level of the file(s) for the network zone. The saturation level comprises a percentage value that indicates the desired distribution for one or more files in the zone. Based on the number of peer servers listed in the download plan, the peer client determines whether the minimum number of peer servers required to contain the file as specified in the download plan is already cached among the peer nodes in the zone. The peer client does not need to know how many peer nodes are in its designated zone, nor does the peer client need to know exactly how many other peer nodes in its zone have a copy of the file. The peer client only needs to determine if the number of peer servers listed in the download plan (the peer servers from which the peer client may obtain the requested file) meet or exceed the minimum number of peer nodes required to contain the file as specified in the download plan. If the peer client determines the minimum number of copies of the file is not yet stored among the peer servers in the zone, the peer client will cache a copy of the file, thereby becoming a peer server to other nodes in the zone that may request file for downloading. However, if the peer client determines that the minimum number of copies of the file is already stored in the zone, the peer client determines, using the saturation percentage value and a random number generator, whether or not to still cache a copy of the file for sharing among other peer nodes in the zone.

The product administrator may set values for the minimum number of peer nodes required to contain a file and the desired saturation percentage for a file when the product administrator sets up the zone information for the central management center to use in determining network proximity or when initially adding the file to the system by setting the values as part of the properties of the file. Alternatively, the values for the minimum number of peer nodes required to contain a file and the desired saturation percentage may be assigned a default value or according to a total number of peer nodes in a given zone. In situations where the values set for a file and the values set for the zone conflict, the values in the file properties may override the values set for the zone. Alternatively, the values that comprise the higher number may override the values comprising a lower number.

The values for the minimum number of peer nodes (servers) required to contain a file and saturation percentage may be set on an individual file basis, on a file per zone basis, or on a global (all files, all zones) basis. In the download plan, the minimum number of peer servers value is used to initially seed a file in a defined number of peer servers in a zone. Once the minimum number of peer servers in the zone is met, the peer client runs a saturation algorithm to determine whether or not to cache the file by comparing the saturation percentage value in the plan against a randomly generated number. For example, if the download plan specifies that the desired minimum number of peer servers required to contain the file for the zone is 3 and that the saturation percentage value is 30%, if at least three other peer servers in the zone have not yet cached the file, the peer client is required to cache the file to meet the minimum peer server value. However, if at least three other peer servers have already cached the file (i.e., the minimum value has been met), the peer client runs a saturation algorithm that compares the saturation percentage value against a randomly generated number to determine whether or not to cache the file. Consider, for example, that the peer client uses a random number generator that generates a number from 1 to 100. As the download plan specifies a saturation percentage value of 30%, the peer client determines to cache the file if the number generated is less than or equal to 30; otherwise, the peer client will not cache the file. Consequently, using the random number generator, a peer client will cache the file 30% of the time, which is the file saturation level desired.

The dynamic content delivery mechanism described in the illustrative embodiments provides several advantages over existing dynamic content delivery systems. The mechanism of the illustrative embodiments prevents peer nodes in a designated zone from all having copies of the same downloaded files by using a saturation algorithm to ensure the saturation percentage value for the files are maintained. Consequently, peer nodes in the zone leave space in their caches for other files to be available for peer download, thus enabling a more efficient use of the peer servers' cache space for the benefit of the zone. Furthermore, the dynamic content delivery mechanism in the illustrative embodiments may reduce network traffic up to the centralized management center. Since a peer client will notify the management center when the peer client stores a copy of the downloaded file, by allowing the peer clients to determine whether or not to cache a copy of a downloaded file, calls to the management center are avoided when the peer client does not cache a copy of the file, thereby benefiting management center performance in a large scale network deployment.

Figure 3:
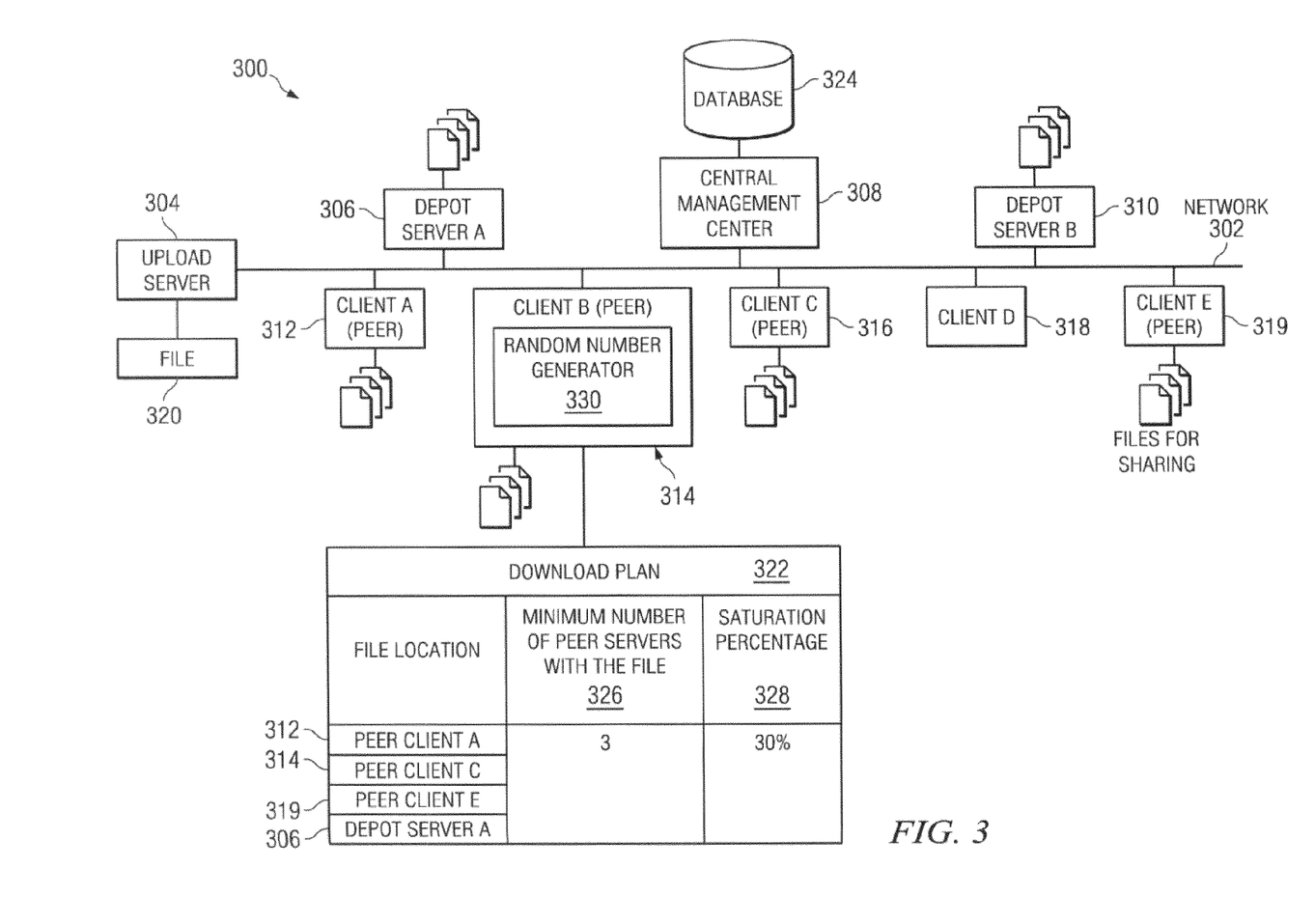
FIG. 3 is a block diagram of a computer system designed for dynamic content delivery in accordance with the illustrative embodiments.

FIG. 3 is a block diagram of a computer system designed for dynamic content delivery in accordance with an illustrative embodiment. In block diagram of a computer system 300, all the clients and servers communicate with each other over network 302, which may, for example, be the Internet. Upload server 304, depot server A 306, central management center 308, and depot server B 310 are servers, such as servers 104 and 106 in FIG. 1. Clients 312, 314, 316, 318, and 319 are representative of clients 110, 112, and 114 in FIG. 1. The dynamic content delivery system may use software such as Tivoli® Provisioning Manager for Dynamic Content Delivery from International Business Machines Corporation.

Central management center 308 manages file content delivery in computer system 300. When a file 320 is uploaded, central management center 308 is notified, and central management center 308 then copies the uploaded file to depot servers. When a peer node (e.g., nodes A 312, B 314, C 316, D 318, or E 319) sends a request to download file 320, central management center 308 creates a download plan 322 for the client. In this illustrative example, nodes include nodes (e.g., peer nodes A 312, B 314, C 316, and E 319) which provide peer download services to other peer clients in the zone, and nodes (e.g., node D 318) which do not.

In a dynamic content delivery system, a file, such as file 320, is published by using upload server 304 to notify central management center 308 that a new file is ready to be uploaded. Central management center 308 makes an entry for file 320 in database 324. Database 324 is an information repository containing information about each uploaded file, such as when the file was uploaded, the size of the file, which depot servers and peer nodes host copies of the file, how many segments the file may contain, the minimum number of peer servers required to contain the file for the zone, and the saturation percentage for the file. Database 324 is typically located in a server, such as server 104 in FIG. 1. Database 324 may be located in central management center 308, as shown in FIG. 3, or database 324 may be located on a remote server, such as depot server B 310.

Once an entry for file 320 has been created in database 324, central management center 308 copies file 320 to other depot servers connected to the network, such as, for example, depot servers A 306 and B 310. Central management center 308 updates the entry for file 320 in database 324 by adding the location of each peer server where a copy of the uploaded file may be found. The entry for file 320 may also the locations of peer nodes, such as peers A 312, B 314, C 316, and E 319, which have previously downloaded file 320 for sharing among other nodes in the zone.

When a node such as peer node B 314 sends a request to central management center 308 requesting to download a file, central management center 308 creates download plan 322 and sends download plan 322 to client B 314. Download plan 322 contains information on the most efficient way to download the file requested by the client, taking into account the load on each depot server and peer server and the proximity of each depot server and peer server to the requesting client. Peer node B 314 uses download plan 322 to open one or more connections with the peer servers specified in the download plan in order to simultaneously retrieve different segments of the file. To download file 320, peer node B 314 selects certain peer servers from the download plan that are located closest to peer node B 314 in order to reduce the network traffic. Peer node B 314 also establishes multiple connections with the depot and peer servers in order to more quickly download file 320. For example, assume central management center 308 determines that file 320 has four segments. In this example, download plan 322 specifies that peer node B 314 download one segment from depot server A 306, the second segment from peer node (peer server) A 312, the third segment from peer node (peer server) C 316, and the fourth segment from peer node (peer server) E 319. Peer node B 314 may thus download file 320 relatively quickly compared to downloading file 320 from one peer server due to the simultaneous retrievals.

In a typical download operation, once a peer client downloads a file, the peer client provides a copy of the file to the peer service running in the peer client. The peer service caches the file, and then notifies the central management center that the peer client has a copy of the file available for sharing among other peer clients in the zone. Consequently, central management center 308 will update the entry for the file in database 324 by adding peer node B 314 as a location where a copy of file 320 may be found.

However, with the mechanism in the illustrative embodiments, once peer node B 314 downloads file 320, peer node B 314 uses information provided in download plan 322 to determine whether or not peer node B 314 needs to cache a copy of file 320 for sharing among other clients in the zone. The information in download plan 322 includes the minimum number of peer servers required to contain the file for the network zone and the saturation percentage of the file for the network zone. Peer node B 314 first checks download plan 322 for the value set for the minimum number of peer servers 326. The minimum number of peer servers 326 value defines the minimum number of peer servers in the network zone that must contain the file in their caches. Peer node B 314 compares the value defined in the minimum number of file peer servers 326 against the number of peer servers listed in download plan 322. Peer node B 314 is required to cache a copy of the file only when a result of the comparison indicates that a minimum number of copies of the file is not yet stored in the other peer clients in the zone. If the comparison indicates that the minimum number of copies of the file is already stored in the other peer clients in the zone, peer node B 314 then determines whether or not to still cache a copy of the file for sharing among other peer nodes in the zone based on the value set for the saturation percentage 328 in download plan 322.

Saturation percentage 328 in download plan 322 defines a desired saturation level of the file among peer nodes in the zone. Peer node B 314 compares the value defined in the saturation percentage 328 against a random value generated at peer node B 314. A random number generator, such as random number generator 330, is used in each peer client to generate a random value for comparison against the saturation percentage value 328. In this illustrative example, the saturation percentage value is 30%. Thus, peer node B 314 is allowed to cache a copy of the file when a result of the saturation comparison indicates that the random value generated at peer node B 314 is equal to or less than the saturation percentage value. If the random value generated at peer node B 314 is greater than the saturation percentage value of 30%, the node will not cache the file. Consequently, once the minimum number of peer servers required to contain the file is met among the peer clients in the zone, each peer client in the zone determines whether to cache the file based on the desired file saturation level and the result of the random number generator.

Consider, for example, the following different scenarios in which the illustrative embodiments may be implemented. In the first scenario, peer node B 314 sends a request to central management center 308 to download file 320. Central management center 308 checks database 324 for information about file 320, but cannot locate any peer nodes in the zone that have a copy of file 320. Central management center 308 returns download plan 322 to peer node B 314, wherein download plan 322 contains no peer servers, but instead contains the location information for depot server A 306 and depot server B 310 which have a copy of file 320. As download plan 322 comprises a minimum number value of 3 peer servers and a saturation percentage value of 30%, when peer node B 314 downloads file 320, peer node B 314 first determines whether or not it is required to cache a copy of file 320. Since the minimum number value of 3 peer servers is greater than the number of peer servers returned in download plan 322, peer node B 314 will cache a copy of the file.

In a second scenario, peer node B 314 sends a request to central management center 308 to download file 320. When central management center 308 checks database 324 for information about file 320, central management center 308 locates two peer clients in the zone that have a copy of file 320. Central management center 308 returns download plan 322 to peer node B 314, wherein download plan 322 contains the location of the 2 peer servers. As download plan 322 comprises a minimum number value of 3 peer servers and a saturation percentage value of 30%, when peer node B 314 downloads file 320, peer node B 314 first determines whether or not it is required to cache a copy of file 320. Since the minimum number value of 3 peer servers is still greater than the number of peer servers (2) returned in download plan 322, peer node B 314 will cache a copy of the file.

In a third scenario, peer node B 314 sends a request to central management center 308 to download file 320. Central management center 308 checks database 324 for information about file 320, and locates three peer clients in the zone that have a copy of file 320. Central management center 308 returns download plan 322 to peer node B 314, wherein download plan 322 contains the location of the 3 peer servers. As download plan 322 comprises a minimum number value of 3 peer servers and a saturation percentage value of 30%, when peer node B 314 downloads file 320, peer node B 314 first determines whether or not it is required to cache a copy of file 320. Since the minimum number value of 3 peer servers is equal to or less than the number of peer servers (3) returned in download plan 322, the minimum number of peer servers required to contain the file in the zone has been met, and peer node B 314 is not required to cache a copy of the file. Peer node B 314 runs the saturation algorithm to determine whether or not to cache the file based on the saturation percentage in download plan 322. Peer node B 314 uses random number generator 330 to generate a random value and compares this random value against the saturation percentage value defined in download plan 322. Peer node B 314 will cache file 320 when the random value is equal to or less than the saturation percentage value, and will not cache file 320 when the random value is greater than the saturation percentage value.

Figure 4:
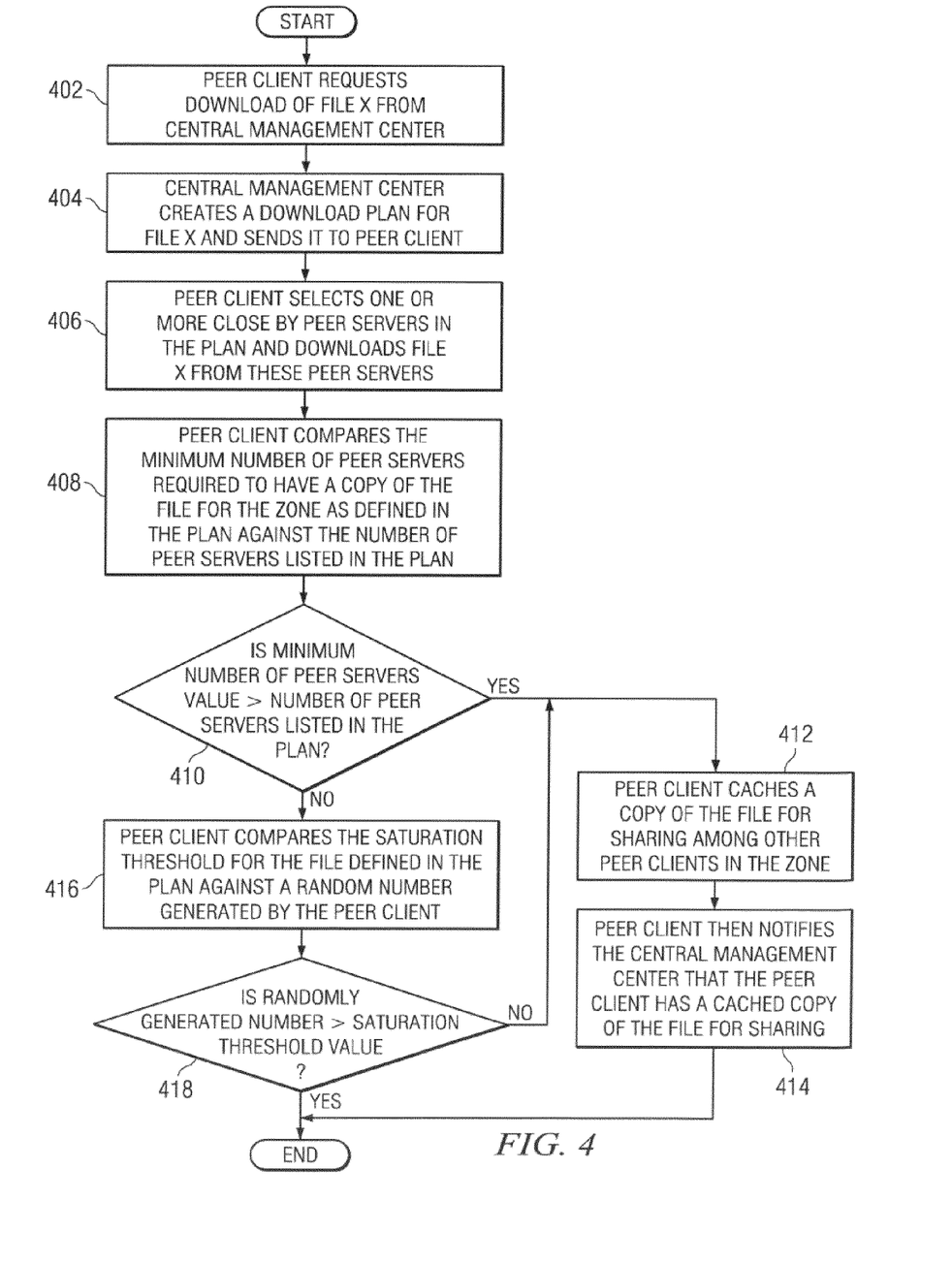
FIG. 4 is a flowchart of a process for managing the caching of files in a peer-to-peer file distribution environment in accordance with the illustrative embodiments.

FIG. 4 is a flowchart of a process for managing the caching of files in accordance with the illustrative embodiments. The process described in FIG. 4 may be implemented in a peer-to-peer file distribution environment, such as computer system 300 designed for dynamic content delivery in FIG. 3. The process begins when a peer client in a peer-to-peer file distribution environment requests the download of a file from a central management center (step 402). In response, the central management center creates a download plan for the file and sends the plan to the requesting peer node (step 404). The peer client selects one or more close-by peer servers listed in the plan and downloads the file from these peer servers (step 406).

Once the file is downloaded, the peer client then compares the minimum number of peer servers required to contain the file for the zone defined in the plan against the number of peer servers listed in the plan (step 408). A determination is made by the peer client as to whether the value of the minimum number of peer servers required to contain the file as specified in the plan is greater than the number of peer servers listed in the plan (step 410). If the value of the minimum number of peer servers required to contain the file as specified in the plan is greater than the number of peer servers listed in the plan ('yes' output of step 410), the peer client knows that the peer clients in the zone do not vet contain the required minimum number of cached copies of the file for sharing. Consequently, the peer client caches a copy of the file for to share among other peer clients in the zone as a peer server (step 412). The peer client then notifies the central management center that the peer client has a cached copy of the file for sharing (step 414), with the process terminating thereafter. The central management center updates information about the file in the database by adding the peer client (now a peer server for the file) as a location where a copy of the file may be found and downloaded by other peer clients in the zone.

Turning back to step 410, if the value of the minimum number of peer servers required to contain the file as specified in the plan is equal to or less than the number of peer servers listed in the plan ('no' output of step 410), the peer client is not required to cache a copy of the file. Instead the peer client determines whether or not to cache a copy of the file based on the saturation percentage value defined in the download plan. The peer client compares the saturation percentage for the file defined in the download plan against a random number generated by the peer client (step 416). A determination is then made by the peer client as to whether the random number generated by the peer client is greater than the saturation percentage value in the download plan (step 418). If the random number generated by the peer client is greater than the saturation percentage value in the download plan ('yes' output of step 418), the peer client does not cache a copy of the file, and the process terminates thereafter. However, if the random number generated by the peer client is less than or equal to than the saturation percentage value in the download plan ('no' output of step 418), the peer client caches a copy of the file for sharing among other peer clients in the zone (step 412) and notifies the central management center that the peer client has a cached copy of the file for sharing (step 414), with the process terminating thereafter. The central management center updates information about the file in the database by adding the peer client (now a peer server for the file) as a location where a copy of the file may be found and downloaded by other peer clients in the zone.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments in the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments in the disclosure has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing file caching in a peer-to-peer file distribution environment, the computer implemented method comprising:
    receiving, at a peer computer in the file distribution environment, a download plan for a file, wherein the download plan comprises a number of peer servers within the file distribution environment where the file is stored and a minimum number of peer servers in the file distribution environment required to store the file;
    responsive to downloading the file from one or more of the peer servers listed in the download plan, determining at the peer computer whether the file is required to be cached at the peer computer by comparing the minimum number of peer servers in the download plan required to store the file against the number of peer servers listed in the download plan; and
    responsive to a determination that the minimum number of peer servers required to store the file in the download plan is greater than the number of peer servers listed in the download plan, caching the file at the peer computer.

2. The computer implemented method of claim 1, further comprising:
    responsive to a determination that the minimum number of peer servers required to store the file in the download plan is not greater than the number of peer servers listed in the download plan, determining whether to cache the file at the peer computer by comparing a random number generated at the peer computer against a saturation level for the file as specified in the download plan;
    responsive to a determination that the random number generated at the peer computer is equal to or less than the saturation level for the file in the download plan, caching the file at the peer computer; and
    responsive to a determination that the random number generated at the peer computer is greater than the saturation level for the file in the download plan, refraining from caching the file at the peer computer.

3. The computer implemented method of claim 2, wherein the saturation level is a percentage value indicating a desired saturation percentage for the file in the file distribution environment.

4. The computer implemented method of claim 2, wherein the minimum number of peer servers and the saturation level for each file in the file distribution environment are set on one of an individual file basis, a file per zone basis, or a global basis.

5. The computer implemented method of claim 1, further comprising:
    responsive to caching the file at the peer computer, sending a notification to a central management center that the peer computer has a copy of the file available for sharing among other peer computers in the file distribution environment.

6. An apparatus comprising:
    a bus;
    a storage device connected to the bus, wherein the storage device contains computer usable codes;
    at least one managed device connected to the bus;
    a communications unit connected to the bus; and a processing unit connected to the bus, wherein the processing unit executes the computer usable codes to receive, at a peer computer in a file distribution environment, a download plan for a file, wherein the download plan comprises a number of peer servers within the file distribution environment where the file is stored, a minimum number of peer servers in the file distribution environment required to store the file; determine at a peer computer, in response to downloading the file from one or more of the peer servers listed in the download plan, whether the file is required to be cached at the peer computer by comparing the minimum number of peer servers in the download plan required to store the file against the number of peer servers listed in the download plan; and cache, in response to a determination that the minimum number of peer servers required to store the file in the download plan is greater than the number of peer servers listed in the download plan, the file at the peer computer.

7. The apparatus of claim 6, wherein the processing unit further executes the computer usable codes to determine, in response to a determination that the minimum number of peer servers required to store the file in the download plan is not greater than the number of peer servers listed in the download plan, whether to cache the file at the peer computer by comparing a random number generated at the peer computer against a saturation level for the file as specified in the download plan; cache, in response to a determination that the random number generated at the peer computer is equal to or less than the saturation level for the file in the download plan, the file at the peer computer; and refrain, in response to a determination that the random number generated at the peer computer is greater than the saturation level for the file in the download plan, from caching the file at the peer computer.

8. The apparatus of claim 7, wherein the saturation level is a percentage value indicating a desired saturation percentage for the file in the file distribution environment.

9. The apparatus of claim 7, wherein the minimum number of peer servers and the saturation level for each file in the file distribution environment are set on one of an individual file basis, a file per zone basis, or a global basis.

10. The apparatus of claim 6, wherein the processing unit further executes the computer usable code to send, in response to caching the file at the peer computer, a notification to a central management center that the peer computer has a copy of the file available for sharing among other peer computers in the file distribution environment.

11. A computer program product for managing file caching in a peer-to-peer file distribution environment, the computer program product comprising:
a computer usable storage device having computer usable program codes tangibly stored thereon, the computer usable program codes comprising:
computer usable program codes for receiving, at a peer computer in the file distribution environment, a download plan for a file, wherein the download plan comprises a number of peer servers within the file distribution environment where the file is stored, a minimum number of peer servers in the file distribution environment required to store the file;
computer usable program codes for determining at the peer computer, in response to downloading the file from one or more of the peer servers listed in the download plan, whether the file is required to be cached at the peer computer by comparing the minimum number of peer servers in the download plan required to store the file against the number of peer servers listed in the download plan; and
computer usable program codes for caching, in response to a determination that the minimum number of peer servers required to store the file in the download plan is greater than the number of peer servers listed in the download plan, the file at the peer computer.

12. The computer program product of claim 11, further comprising: computer usable program code for determining in response to a determination that the minimum number of peer servers required to store the file in the download plan is not greater than the number of peer servers listed in the download plan, whether to cache the file at the peer computer by comparing a random number generated at the peer computer against a saturation level for the file as specified in the download plan;
computer usable program code for caching, in response to a determination that the random number generated at the peer computer is equal to or less than the saturation level for the file in the download plan, the file at the peer computer; and
computer usable program code for refraining, in response to a determination that the random number generated at the peer computer is greater than the saturation level for the file in the download plan, from caching the file at the peer computer.

13. The computer program product of claim 12, wherein the saturation level is a percentage value indicating a desired saturation percentage for the file in the file distribution environment.

14. The computer program product of claim 12, wherein the minimum number of peer servers and the saturation level for each file in the file distribution environment are set on one of an individual file basis, a file per zone basis, or a global basis.

15. The computer program product of claim 11, further comprising:
computer usable program code for sending, in response to caching the file at the peer computer, a notification to a central management center that the peer computer has a copy of the file available for sharing among other peer computers in the file distribution environment.

16. The computer program product of claim 11, wherein the computer usable program code is stored in a computer readable storage device in a data processing system, and wherein the computer usable program code is downloaded over a network from a remote data processing system.

17. The computer program product of claim 11, wherein the computer usable program code is stored in a computer readable storage device in a server data processing system, and wherein the computer usable program code is downloaded over a network from a remote data processing system for use in a computer readable storage device with the remote data processing system.

* * * * *